UNITED STATES PATENT OFFICE.

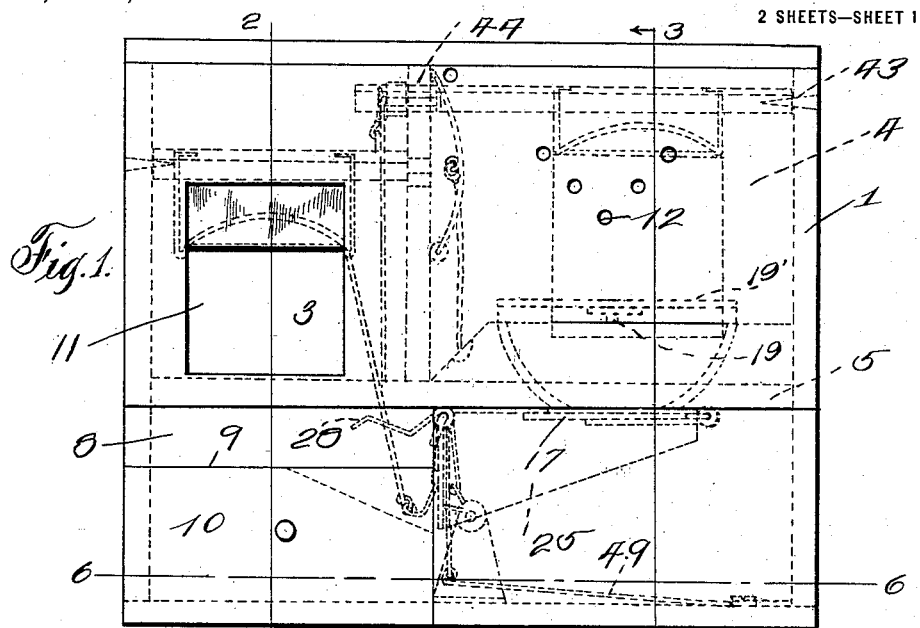

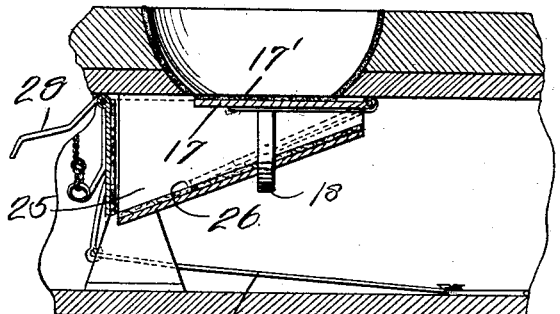
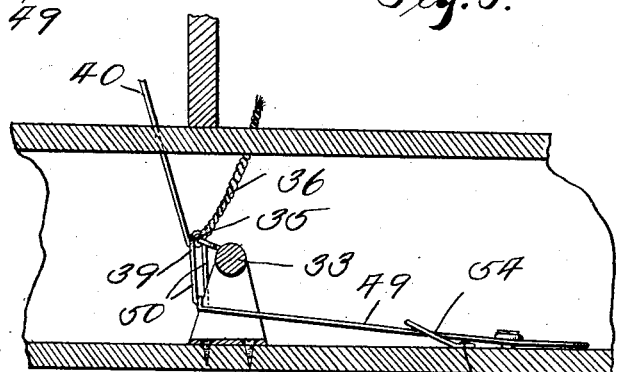
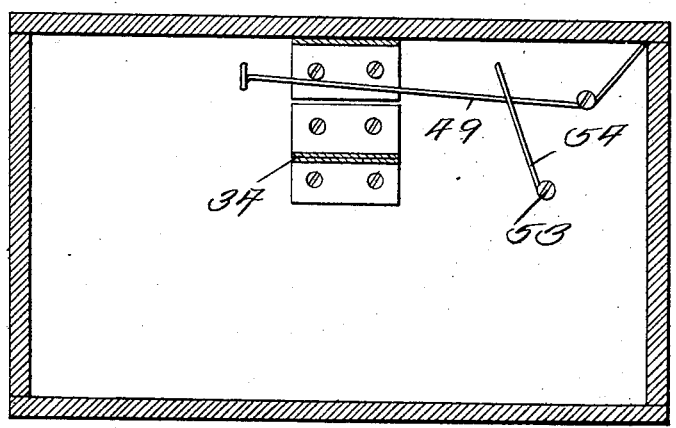

WARREN D. CASE, OF WARREN, OREGON; JOHN FARR ADMINISTRATOR OF SAID CASE, DECEASED.

TRAP-NEST.

1,186,509.  Specification of Letters Patent.  Patented June 6, 1916.

Application filed September 21, 1914. Serial No. 862,734.

*To all whom it may concern:*

Be it known that I, WARREN D. CASE, a citizen of the United States, residing at Warren, in the county of Columbia, State of Oregon, have invented certain new and useful Improvements in Trap-Nests; and I do hereby declare the following to be a full, clear, and exact description of the invention, such as will enable others skilled in the art to which it appertains to make and use the same.

This invention relates to a trap nest.

An object of the invention is to provide a nest which after the hen has entered will retain her within until after she has laid an egg.

A further object of the invention is to provide means within the nest for automatically transferring the egg to a suitable receptacle.

A still further object of the invention is to provide means for automatically releasing the doors to allow the hen to depart from the nest.

With these and other objects in view, such as will appear as the description progresses, my invention comprises the combination and arrangement of parts as herein set forth and subsequently claimed.

Referring to the drawings: Figure 1 is a front elevation of my device with the entrance door open, and the egg receiving drawer in place. Fig. 2 is a section on the line 2—2 of Fig. 1. Fig. 3 is a section on the line 3—3 of Fig. 1. Fig. 4 is a longitudinal vertical section through the egg chute. Fig. 5 is a similar section through the door operating mechanism. Fig. 6 is a section on the line 6—6 of Fig. 1.

Referring to the drawing by reference characters wherein like parts are indicated by like characters: The device comprises a rectangular box 1 divided into three compartments 2, 3 and 4 by a horizontal shelf 5 and a vertical partition 6. The front wall of the device is made of two pieces, the lower piece 8 of which is detachable so as to allow entrance to the operating mechanism should it be necessary to repair the same. In this piece 8 is formed an aperture 9 in which is slidably mounted a drawer 10, the purpose of which will hereinafter be apparent. In the upper piece of the front is formed a doorway 11 and leading to compartment 3 and a series of holes 12 through which air passes to compartment 4.

In the vertical partition 6 is formed a door-way 13 through which the compartments 3 and 4 communicate. In the rear wall of the device and leading from the compartment 4 is a doorway 14.

The floor of the compartment 4 is slightly raised above the level of the floor of compartment 3 and has therein and extending therethrough a nest 15 lined with felt 15' having an aperture 16 in the bottom thereof closed by a shelf 17 covered with felt 17' which is held in its closed position by a spring arm 18 secured to a downwardly extending rod 19 in compartment 2, the other end of which rod is secured to a false floor 19'. Pivoted above the doorway 11 and opening inwardly is a door 20 adapted to swing upwardly on a horizontal pivot and pivoted above the door 13 and on the side of the partition 7 in the compartment 4 are two outwardly extending arms 21, to the lower ends of which is attached a bar 22 extending entirely across the doorway 13 and midway its height. Hinged on a bar 23 within the compartment 4 and adapted to swing outwardly through the doorway 14 is a door 24. The doors 20 and 24 are operatively connected to the bar 22 in such manner that when the said bar is moved inwardly toward the compartment 4 the doors will be closed; the operating mechanism will be hereinafter described.

Leading from the nest 15 and in communication with the aperture 16 is a chute 25 lined with felt or other desirable soft material 26 and closed at its lower end by a door 27 pivoted to the under side of the partition 5 and held in closed position by a spring 28 which presses against the door and against the partition. Secured to the pivot 29 on which the door 27 is secured is a latch member 30 which is integral with the door 27 extending downwardly adjacent the said door and parallel therewith and having on its lower end an off-set 31 adapted to coöperate with a projection 32 on a shaft 33 pivoted between ears 34 secured to the bottom of the device in the compartment 2 and to the rear of the chute 25. This projection when in contact with the off-set 31 holds the door 27 in such position that the lower end of the chute is closed. Secured to this shaft 33 is an eye 35 having a cord 36 attached thereto and extending upwardly through an aperture 37 in the bottom of the compartment 4 and connected to a loop 38 in one of the arms 21 in such manner so that when the bar 22 is raised it will rotate the shaft 33 until the projection 32 engages the off-set 31 and holds the door 27 in closed position. A second eye 39 is attached to the shaft 33 and has secured thereto a rod 40 extending upwardly through an aperture 41 in the bottom of compartment 3, and is connected at 42 to the oscillating bar 23 which is mounted at 43 in one end of the device and extends through an aperture 44 in the wall 6.

Pivoted to the upper part of the side of the wall 6 within the compartment 3 is a lever 45 connected to the rod 40 by a link 46 and having its other end connected by a link 47 to an eye 48 on the door 20 so that when the shaft 33 is oscillated by the action of the rod 22 and its connecting mechanism the door 11 will be automatically closed and inasmuch as the door 24 is secured to the bar 23 this door is automatically closed. After the projection 32 has been disengaged from the off-set 31 on the latch 30, the spring 49 secured to the bottom of the device and connected to the shaft 33 by links 50 rotates the said shaft so as to pull the rod 40 downwardly and through the operating mechanism connected thereto open the doors 11 and 14.

Connected to one lower corner of the door 20 and extending downwardly through an aperture 51 in the bottom of compartment 3 is a cord 52 connected to the door 27 so that when the first mentioned door 20 is raised the door 27 will be likewise raised and held in such position.

The device operates as follows: When a hen enters compartment 3 through the doorway 11 the door 20 is in its open position and likewise the door 24. As the hen passes through the doorway 13 its back comes in contact with the bar 22, the distance between the bar and floor being such as to make this necessary. When the hen's back contacts with the bar 22 and she proceeds to enter the compartment 4 where the nest 15 is located, the said bar is swung about its pivotal support and through the cord 36 the shaft 33 is operated which in turn through the bar 40 operates to close the doors 20 and 24, thus closing the hen within the compartment 4 and on the nest therein. When an egg is laid it drops upon the shelf 17 and when the hen steps on the false floor 19' the shelf is opened and allows the egg to roll down the chute 25 until it strikes the door 27 and opens the same, thus oscillating the shaft on which it is secured. This movement releases the latch member 30 from engagement with the projection 32 on the shaft 33 and allows the spring 49 to pull the rod 40 downwardly and open the doors 20 and 24 and the hen is thus allowed to escape through the door 24.

The drawer 10 adjacent the lower end of the chute which is padded with felt 9' receives the egg as it passes out of the chute and is of such size as to accommodate a number of eggs so that the collecting will only have to be done at great intervals.

In order that the tension of the spring 49 may be varied, I have secured at 53 a second spring 54 which bears upon the spring 49 and is adjustable thereon so that the length of the operating part of the said spring 49 may be varied and thus the tension of the same varied.

From the foregoing description it may be seen that I have provided a device, the doors of which when the hen enters will be automatically closed, and I have further provided means for automatically opening the said doors after the egg has been laid in the nest within the device, and I have further provided said means to transmit the egg from the nest to a receiver which will preserve the egg in its unbroken condition.

What is claimed is:—

1. In a trap nest comprising a plurality of compartments, doorways formed in two of said compartments, doors for closing the same, and means for opening said doors automatically including a bar pivotally secured within two of said compartments and to which one of the doors is secured, a lever linked to said bar at one of its ends and secured at its other end to the other door, a rod connected to said bar, a shaft pivotally secured in the lowermost compartment to which the rod is attached, a spring within the last mentioned compartment to operate the shaft to throw the doors into open position, means coöperating with said shaft tending to prevent said movement, a nest having a hinged bottom, a chute leading from said nest to the last mentioned means and means for swinging the bottom away from the nest.

2. A device of the class described comprising a trap nest having a lower compartment and two compartments immediately thereover, a doorway communicating with each of said compartments and doors in each of said compartments, means to close said doors, means to hold said doors in their closed positions, a nest having an opening in the bottom thereof in one of said upper compartments, a shelf pivoted below said opening, a chute in the lower compartment communicating with said opening, a receptacle to which said chute leads, a door pivoted at the lower end of said chute, and a latch secured thereto to hold the last mentioned door in its closed position.

In testimony whereof, I affix my signature, in the presence of two witnesses.

WARREN D. CASE.

Witnesses:
E. E. QUICK,
H. P. WATKINS.